April 22, 1941.          B. L. MILLS          2,239,463
WHEEL
Filed July 30, 1936
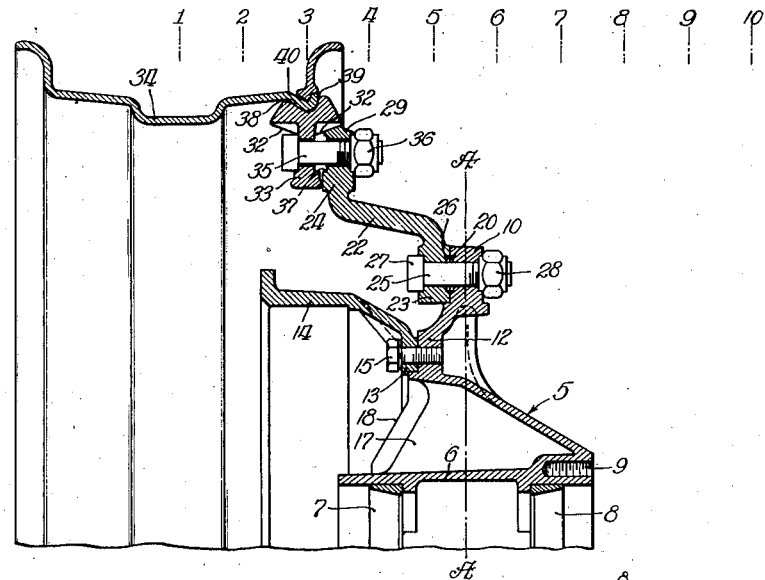
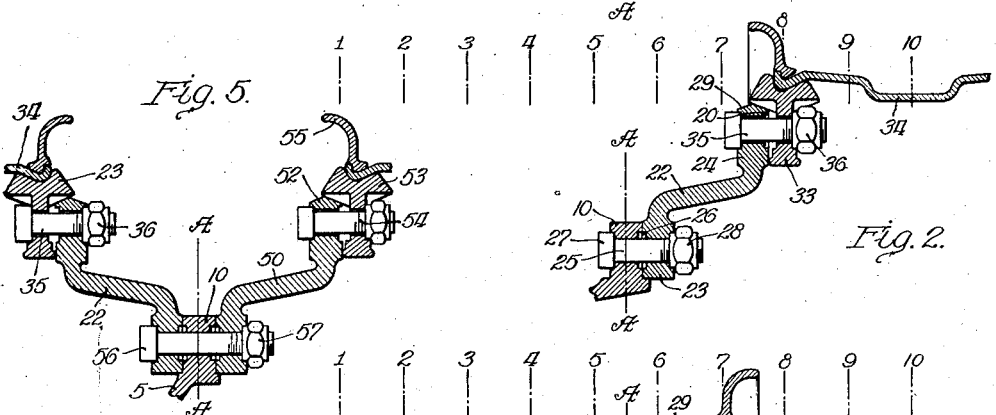
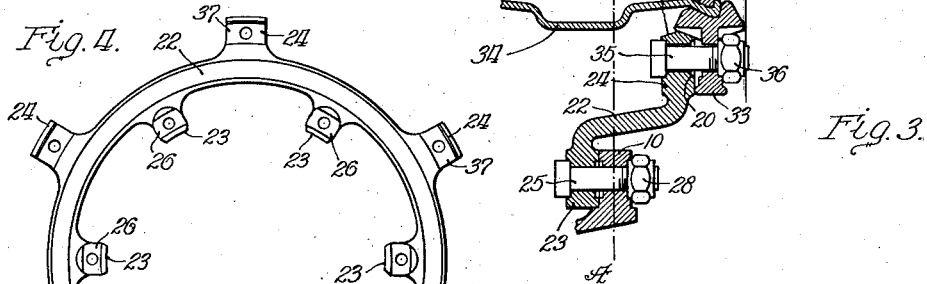
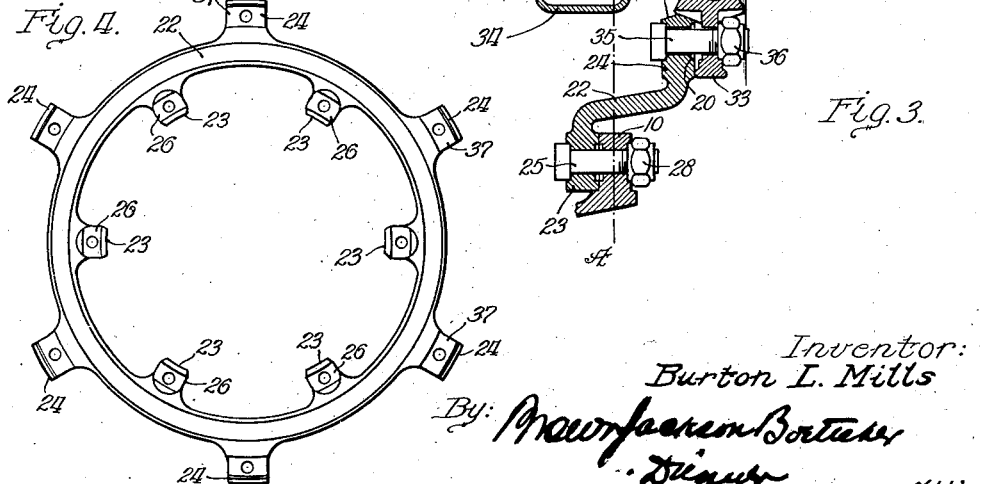
Inventor:
Burton L. Mills Patented Apr. 22, 1941

2,239,463

UNITED STATES PATENT OFFICE 2,239,463

WHEEL

Burton L. Mills, Buchanan, Mich., assignor, by mesne assignments, to Wingfoot Corporation, Wilmington, Del., a corporation of Delaware Application July 30, 1936, Serial No. 93,348

12 Claims. (Cl. 301—9)

This invention relates to wheels, and more particularly to wheels for power-driven agricultural vehicles, such as tractors and the like.

The use of pneumatic tires on farm tractors and the like has become increasingly prevalent in the past few years and has raised problems of wheel construction and design looking toward simplification of rim mountings and tire support. In addition, it has been found necessary to provide constructions wherein the distance between the wheels can be varied to suit the particular purposes for which the tractor is employed. The tread distance for the tractor varies in the cultivation of various crops, and requires that a simplified and economical structure for accommodating such variations be provided.

I am somewhat familiar with previous attempts to solve this problem, in one of which the hub is mounted on a specially designed splined axle shaft, with the variations in tread being attained by shifting the hub and wheel body with respect to the axle. In another attempted solution of this problem, a heavy peripheral solid ring has been secured to the wheel body, and can be reversed in position to secure a difference between extreme positions of some 14 inches at each wheel, or about 28 inches total difference in tread positions. However, this is not accomplished in an even series of steps, so far as I am aware, and the construction employed is also objectionable due to overhang of the wheel body projections when the rim is in innermost position, which may cause damage to adjacent rows of crops, is unsightly, and constitutes a hazard to anyone working around the tractor. Both types of construction are expensive, require considerable machining and are complicated in design.

The present invention contemplates an improved wheel construction of this general type which is simple in construction and adjustment, and is capable of economical production, while attaining a range of tread spacings not hitherto attainable in any structures with which I am familiar.

With the present construction it is possible to provide ten separate positions of the center line of the tread at each wheel, each position being uniformly spaced with respect to the next adjacent position.

Another feature of the present invention is the simplified manner in which the wheel can be shifted from one position to another position. For example, shifting from the extreme inner position to the extreme outer position requires the resetting of only six clamping bolts. This is also true in shifting from any one position to the next adjacent position, in the majority of the positions.

Still another advantage secured by the present invention is the provision of a wheel structure which, when the rim is in its innermost position, presents no projecting peripheral bosses, which are extremely undesirable.

The present invention also possesses the advantage of producing a chording action on the rim when it is mounted in position, in order to seat it firmly on the lugs against any possible displacement, and at the same time provides a lug mounting arrangement which positively holds the rim against any lateral cocking or tilting.

Another advantage of the present invention is the provision of a demountable wheel structure of this type in which the wheel body per se is maintained in fixed position with respect to the axle housing and drive spindle, while all variations in tread spacing are accommodated by shifting of either the ring or lug. In addition, the present construction is economical to manufacture, the lugs being simple drop forgings or castings, while the ring and wheel body are castings so designed as to require little machining.

Still another feature of the present invention resides in the fact that the wheel assembly may be readily converted into a dual wheel construction by mere duplication of certain parts. This is distinctly desirable where added tractive effort is required, such as on damp sodded ground, sand or the like.

Other objects and advantages of the present invention will appear more fully from the following detailed description which, taken in conjunction with the accompanying drawing, will disclose to those skilled in the art the particular construction and operation of a preferred form of the present invention.

In the drawing:

Figure 1 is a sectional view through the wheel assembly, showing the rim in its innermost position, and indicating diagrammatically the various positions to which the rim can be shifted;

Figure 2 is a partial sectional view showing the rim in its outermost position;

Figure 3 is a view corresponding to Figure 2, showing the rim shifted into an intermediate position;

Figure 4 is a front elevational view, on a reduced scale, of a ring such as may be used in the present invention; and Figure 5 is a partial sectional view showing a modified form of the invention.

Referring now in detail to the drawing, in Figure 1 I have shown a wheel body, generally indicated at 5, having a hub portion 6 provided with suitable bearing supports 7 and 8 for mounting the hub on an axle housing or the like. The outboard end of the hub portion is provided with a series of circumferentially spaced threaded openings 9 by means of which the drive spindle may be rigidly secured to the hub of the wheel body 5.

The wheel body 5 is provided with a series of radially extending circumferentially spaced bosses 10 forming in effect, radially extending spokes, and disposed rearwardly and radially inwardly of the bosses 10 are shouldered thickened boss portions 12 suitably tapped to receive the head flange 13 of a brake drum 14 which is secured thereto by means of the bolts 15. Suitable reinforcing ribs 17 are provided between the hub portion 6 and the radially outwardly extending portion of the wheel body, and a suitable closure plate 18 for the head of the brake drum is clamped between the drum and the portion 12 of the wheel body radially inwardly of the bolts 15, as described in detail in the copending application of Frederick W. Burger, Serial No. 72,329, filed April 2, 1936 now Patent No. 2,094,637, October 5, 1937.

It will be noted that the bosses 10 are provided with recesses 20 in opposite faces thereof for a purpose to be hereinafter described. Mounted on, and held in fixed lateral position with respect to the central plane of the wheel body, indicated by the line A—A, is an annular ring member 22, shown more in detail in Figure 4. This member comprises a plurality of radially inwardly extending spaced bosses 23 and axially offset radially outwardly extending bosses 24. These bosses, as indicated in Figure 4, may be staggered with respect to each other, each of the inwardly extending bosses 23 being disposed intermediate adjacent bosses 24. However, this construction is not required and, if desired, the bosses 23 and 24 may be disposed in radial alignment as indicated in Figure 1.

The ring 22 is secured to the wheel body 5 by means of a plurality of bolts 25 which pass through the inwardly extending bosses 23 and through the boss 10 of the wheel body. The inwardly extending bosses 23 have recesses 26 formed in opposite lateral faces thereof, and the squared head 27 of the bolt 25 is adapted to fit within either of the corresponding recesses 26 to prevent the bolt from turning when the nut 28 is tightened thereon. By reason of the abutting planar engagement between the lateral faces of the bosses 23 and 10, the ring 22 is held in fixed lateral position on the wheel body with respect to the center plane thereof.

The outer ends of the radially outwardly extending bosses 24 are beveled axially inwardly as indicated at 29 and 30, and are adapted to be engaged by the corresponding beveled surfaces 32 of the lug members 33 which support the tire rim 34 on the ring 22. The lugs 33 are clamped to the bosses 24 by means of the bolts 35 which extend through aligned openings therein, and when the nut 36 is tightened, wedge surface 32 of the lug radially outwardly on the corresponding beveled surfaces 29 or 30 of the boss 24. The lateral faces of the shank portions of the lugs 33 are recessed to hold the bolt head from rotation during the clamping operation and similar recesses are formed in the opposite lateral faces of the bosses 24 as indicated at 37.

The outer surface of the lug 33 is provided with a beveled recessed portion 38 and with a substantially radially extending lip 39 whereby the beveled edge 40 of the rim 34 is engaged against the beveled surface 38 of the lug, and when the peripheral series of lugs 33 are wedged into position on the bosses 24, the rim is chorded into wedged engagement on the lugs 33 in fixed radial position with respect to the center plane of the wheel body 5. Due to the fact that the lugs 33 are all held in planar alinement with the wheel by bosses 24, and the rim 34 is self-centered in the lugs, the rim is maintained in alined planar position with respect to the wheel body 5.

The innermost position of the rim 34 with respect to the wheel body 5 is indicated by the arrangement shown in Figure 1, in which the center line of the rim falls along the line 1—1 of this figure. The corresponding center lines 2—2 to 10—10 inclusive, indicate the other positions in which the center line of the rim is disposed when it is shifted to change the spacing of the tread, it being understood that both rims can be shifted, or only one rim shifted, as desired.

It is apparent, from these center lines of the rim, that in each adjacent shifted position the rim is uniformly spaced with respect to the next adjacent position so that the successive steps are uniform throughout the range of shifting movement. In the present embodiment of the invention, I have provided a construction wherein the spacing is accomplished in two-inch steps, giving a total range of 20 inches for each wheel from one extreme position to the opposite extreme position, or a total possible tread spacing variation of 40 inches when both wheels are shifted to opposite extreme positions. Of course, depending on the thickness of bosses 10, 23 and 24, the width of the rim, and the shank of the lug 33, this spacing can be widely varied.

When it is desired to move the rim 34 to the position indicated by the center line 10—10, the parts are mounted in the manner shown in Figure 2. This mounting is substantially the same as described in connection with Figure 1, except that the ring 22 has been reversed in position and mounted upon the opposite face of the boss 10, that is, on the outboard side of the boss, whereas, in Figure 1 the ring 22 is mounted on the inboard side of the boss. In the position shown in Figure 2, the lug 33 is wedged against the beveled surface 30 of the boss 24, the same as in Figure 1, and it will be obvious that the only parts which must be disassembled to shift from one extreme position as shown in Figure 1 to the other as shown in Figure 2 are the clamping bolts 25, which must be removed in order that the ring 22 can be reversed in position and at the same time placed on the outboard side of the boss 10. The ring must, of course, be rotated slightly to clear the bosses 10 when passed to the outboard side of the wheel.

In Figure 3, I have illustrated one manner of mounting the rim 34 in a position intermediate the extreme positions and, as indicated in this position, the rim assumes the fifth possible position indicated by the center line 5—5. However, in this case, it is to be noted that the lug 33 has been reversed with respect to the boss 24 so that it supports the rim in a position overlying the ring 22 whereas, in Figures 1 and 2, the lug supported the rim 34 in a position extending away from the ring 22.

A consideration of the construction disclosed will indicate that the ring 22 is capable of being mounted in four different positions with respect to the boss 10. Three of these positions are indicated in Figures 1, 2 and 3, and the fourth position is a position in which the boss 23 is mounted on the outboard side of the boss 10 with the offset portion of the ring 22 extending across the center line A—A of the wheel body, producing a position substantially the reverse of that shown in Figure 3, or a position which would be attained if the boss 23 of Figure 1 were merely shifted from the inboard side of the boss 10 to the outboard side thereof without changing the lateral position of the ring.

It is also apparent that the lug 33 can be mounted in either of two possible positions with respect to the boss 24. One of these positions is shown in Figure 1. A second position can be obtained by moving the lug 33 from the inboard side of the boss 24 to the outboard side thereof, and wedging the surface 32 of the lug radially outwardly on the tapered surface 29 of the boss 24 instead of the tapered surface 30 thereof.

This shift in position would shift the center line of the rim 34 from the position shown in Figure 1 to a position indicated by the line 2—2 of Figure 1. Similarly, by shifting the lug 33 of Figure 3 from the outboard side of the boss 24 to the inboard side, the center line of the rim 34 could be shifted from the position indicated by the line 5—5 to a position indicated by the line 4—4.

It is also possible to have the rim positioned in two possible positions on the lug 33. That is, the lug 33 can be reversed while it remains on one side of the boss 24 to throw the rim either inwardly of the boss 24 or outwardly thereof in a manner such as indicated in Figures 2 and 3. In Figure 2, the lug is so mounted with respect to the boss 24 that the rim is thrown to the outboard side of the boss to a position indicated by the line 10—10. When the lug is reversed in position, as indicated in Figure 3, the rim is thrown to the inboard side of the boss 24 and would assume a position indicated by the line 6—6 providing the boss 23 remained clamped to the outboard surface of the boss 10.

In order to bring out fully the manner in which shifting of the rim 34 from the position shown in Figure 1 to the position shown in Figure 2 through all of the intermediate positions is accomplished, I shall describe the various arrangements of the parts for each of the different positions.

To shift from position 1—1 to position 2—2, it is necessary either to move the boss 23 from the inboard side of the boss 10 to the outboard side thereof by loosening of bolts 25, or this can be accomplished by moving the lug 33 from the inboard side of the boss 24 to the outboard side thereof by loosening bolts 35.

With the rim in position 2—2, it can be shifted into position 3—3 by shifting either the boss 23 or lug 33 to the outboard side of the boss 10 or boss 24, respectively, depending upon which of these members had been shifted to attain position 2—2.

With the rim in position 3—3, it can be shifted into position 4—4 by clamping the ring 22 to the inboard side of the boss 10 in a position similar to the manner in which the ring is shown in Figure 3 and moving the lug 33 to the inboard side of the boss 24 which would shift the rim 34 of Figure 3 from position 5—5 to position 4—4.

The reverse of this movement would effect shifting of the rim from position 4—4 to position 5—5.

In order to move from position 5—5, shown in Figure 3, to position 6—6, it is necessary only to remove the bolts 25 and dispose the ring 22 on the outboard side of the boss 10 in the same manner that the ring is mounted in Figure 2.

To attain position 7—7, the ring 22 may be mounted on the inboard side of the boss 10 in the same manner that the ring is mounted in Figure 2, but extending inwardly of the wheel body with the lug 33 mounted on the inboard side of the wheel, a position which would be substantially the reverse of that shown in Figure 3 except that the ring 22 is retained in engagement on the inboard side of the boss 10.

To move from this position to position 8—8, the ring would be restored to the position shown in Figure 3, and the lug 33 and rim 34 would be reversely mounted on the inboard side of the boss 24 with the rim extending toward the outboard side of the wheel. From position 8—8 to position 9—9 requires only the shifting of the lug 33 from the inboard to the outboard side of the boss 24, or the shifting of the ring 22 from the inboard to the outboard side of the boss 10. Depending upon which of these shifts was performed to attain position 9—9, the alternative shift would throw the rim 34 from position 9—9 to position 10—10, or to the position shown in Figure 2.

It will be apparent that in the majority of these shifting movements it is necessary only to remove one set of bolts, either the bolts 25 or the bolts 35. However, in shifting from position 3—3 to position 4—4, or vice versa, and in shifting from position 7—7 to position 8—8, or vice versa, it is necessary that both sets of bolts be removed to accommodate the shifting movement. However, the shift from position 3—3 to position 8—8, or from position 4—4 to position 7—7, or from position 4—4 to positions 5—5 or 6—6, can be accommodated by removal of only one set of bolts, these being the bolts 25. Similarly, from position 1—1, shifting can be effected to positions 2—2, 3—3, 5—5, 6—6, 8—8, 9—9 and 10—10 by removal of only one set of bolts.

It is therefore apparent that I have provided a wheel construction for vehicles of this type which is capable of accommodating any desired tread spacings within the limits of the construction which, in the present embodiment of the invention, constitutes a range of 40 inches. Also, it is possible by the present construction to shift the tread in either two-inch or four-inch steps through this entire range, if required, by the shifting of either one or both wheels.

Of course, with different axial thicknesses of the bosses 10, 23, 24 and the shank of lug 33, and with different widths of rim 34, various other ranges of spacings are obtainable and it is to be understood that the present invention is not limited to the particular range described, since this is for the purpose of illustration only.

It is thus obvious that ring 22 can be positioned in any one of four different positions with respect to the wheel body 5 and, that the lug can be positioned on either side of the boss 24 of the ring and is capable of supporting the rim in either of two positions when disposed on either side of the boss 24. It is thus apparent that there are sixteen different rim, ring and lug position combinations which it is possible to obtain. However, in positions 2—2 and 9—9, two different combinations will duplicate each of these positions while in positions 5—5 and 6—6, three different combinations of the parts are possible to provide either of these two positions. This makes six duplications throughout the shifting range and consequently, there are only ten different positions actually attainable. However, the range of forty inches possible variation in tread spacings is more than sufficient to accommodate the tractor for any desired use so far as I am now aware.

The ring 22 may be formed as a simple casting, and the bosses 23 and 24 can be readily machined at low cost to provide the proper abutting surfaces. Similarly, the lugs 33 can be formed either as castings or forgings, and can be produced in quantity at low cost. The bolts and nuts are preferably standard. This reduces the cost of the assembly considerably and renders its use highly advantageous.

In some instances it may be desirable to provide a dual wheel mounting on each end of the axle in order to secure better traction when using the tractor on wet grass, sand or the like. A modification of the present construction suitable for this purpose is shown in Figure 5, in which the wheel body 5 is provided with a first ring member 22 clamped to the boss 10 of the wheel body on the inboard side and supporting the lug 33 in the manner described in connection with Figure 1, the lug 33 carrying a rim 34 in the position shown in Figure 1. A second ring 50 is provided corresponding to the ring 22 and mounted in a position corresponding to the mounting of the ring 22 in Figure 2. At the upper end of the ring 50 there is provided a boss 52 corresponding to the boss 24 of the ring 22, which is adapted to receive a lug 53 clamped thereto in the same manner by the bolt 54. The lug 53 supports a second rim 55 in outwardly extending position, the parts on the outboard side of the wheel being assembled in substantially the same manner as indicated in Figure 2. Both of the rings 22 and 50 are conjointly mounted on the opposite faces of the boss 10 by an elongated bolt 56 which extends therethrough, and carries the nut 57 for clamping the rings in position. It is apparent that with this wheel mounting, two tires can be supported on the rims 34 and 55 and substantially double the tractive effort can be secured at each wheel.

It is therefore believed that I have produced a relatively simple wheel construction for tractors and similar vehicles of this general type which is capable of economic formation and rapid assembling, and of a simplified design such that the ordinary operator of such a vehicle may readily shift the rim into any desired position without the use of any but ordinary tools.

I am aware that various changes and modifications are possible in the construction disclosed, and it is to be understood that the relatively proportioning of the parts, as for example the amount of offset of the bosses 23 and 24 of the ring 22, can be subjected to wide variations without, however, departing from the principles underlying the present invention. I therefore do not intend to be limited except as defined by the scope and spirit of the appended claims.

I claim:

1. In a wheel of the class described, a wheel body, a reversible ring member having axially offset inner and outer edges and adapted to be mounted in any one of four positions on the periphery of said wheel body, reversible rim-seating lugs adapted to be mounted in any one of two positions on either side of said ring independently of the mounting of the ring on the wheel body, and a tire-supporting rim seated on said lugs independently of the mounting of said lugs on said ring.

2. A wheel comprising a wheel body having radially extending circumferentially spaced bosses, a ring having a series of radially inwardly extending bosses and a series of axially offset radially outwardly extending bosses, means for securing said series of inwardly extending bosses to said wheel body bosses in any one of a plurality of positions, and reversible means optionally engageable with either side of said outwardly extending bosses for mounting a tire rim on said outwardly extending bosses of said ring in any one of a plurality of positions.

3. In combination, a wheel body having a series of coplanar radially extending peripheral bosses, a ring having a corresponding series of inwardly extending bosses adapted to be clamped to said first-named bosses and having opposite laterally directed rim supporting seats about the periphery thereof, and lug members optionally engageable with said seats for supporting a tire rim in one of two axially offset positions on either side of said ring.

4. In combination, a wheel body having a series of coplanar radially extending peripheral bosses, a ring having a corresponding series of inwardly extending bosses adapted to be clamped to said first-named bosses in any one of at least three different positions, axially offset radially outwardly extending bosses on said ring each having opposed rim lug seats, and reversible lug means for supporting a tire rim on said last-named bosses in optional positions.

5. A wheel comprising a wheel body having a series of peripheral bosses, a pair of rings having axially offset series of inwardly and outwardly extending bosses, rim supporting means for each of said rings clamped to the outwardly extending bosses of said rings on opposite sides of said peripheral bosses.

6. In combination, a wheel body having a series of peripheral bosses, a pair of ring members adapted to be clamped on opposite sides of said bosses, each of said ring members having a series of peripheral bosses, and rim-supporting means clamped to each of said last-named series of peripheral bosses.

7. A ring for a wheel wherein the tire rim may be mounted in any one of a number of positions parallel to the plane of the wheel, comprising an annular frusto-conical ring portion, a series of radially inwardly extending bosses at the smaller end of said portion, and a series of radially outwardly extending bosses at the larger end of said ring portion.

8. The ring of claim 7 characterized by the bosses in one series being alternated circumferentially with the bosses of the other series.

9. A ring for a wheel of the demountable variable tread type comprising a laterally extending annular ring portion having a series of radially inwardly extending bosses and a series of radially outwardly extending bosses axially offset at opposite edges of the ring portion.

10. In combination, a wheel body, a ring member, means for securing the ring member to the periphery of said wheel body with the periphery of the ring in various positions with respect to the plane of said wheel body, a series of peripheral bosses on said ring member, lugs having means for supporting the beveled edge of a tire rim and means for simultaneously clamping said lugs to said bosses and wedging said lugs radially outwardly to chord said rim thereon.

11. In combination, a wheel body having an outwardly directed peripheral flange, a ring adapted to be optionally secured to either lateral face of said flange, and clamping means optionally secured to the outer periphery of said ring on either lateral face thereof, including means for chording a tire rim into fixed position with respect to said wheel body.

12. In combination, a wheel body having a series of peripheral bosses, a pair of ring members adapted to be clamped on opposite sides of said bosses and each having a peripheral series of oppositely directed rim lug seats, rim supporting means adapted to be optionally clamped to either of said series of rim lug seats on said ring members, and tire rims carried by said rim supporting means.

BURTON L. MILLS.